United States Patent
Hsu et al.

(10) Patent No.: US 8,134,304 B2
(45) Date of Patent: Mar. 13, 2012

(54) LIGHT SOURCE DRIVING DEVICE CAPABLE OF DYNAMICALLY KEEPING CONSTANT CURRENT SINK AND RELATED METHOD

(75) Inventors: Kuo-Ching Hsu, Hsinchu (TW); Tsung-Hau Chang, Hsinchu (TW); Chin-Hsun Hsu, Taipei County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 306 days.

(21) Appl. No.: 12/629,864

(22) Filed: Dec. 2, 2009

(65) Prior Publication Data

US 2011/0018450 A1 Jan. 27, 2011

(30) Foreign Application Priority Data

Jul. 24, 2009 (TW) .............................. 98125032 A

(51) Int. Cl.
*G05F 1/00* (2006.01)
(52) U.S. Cl. ........ 315/291; 315/294; 315/308; 315/302; 315/312; 315/169.1
(58) Field of Classification Search .................. 315/291, 315/294, 307, 308, 224, 247, 312, 185 R, 315/302, 169.1, 216, 287; 345/42, 82, 63, 345/204; 363/89
See application file for complete search history.

(56) References Cited

U.S. PATENT DOCUMENTS

| | | | | |
|---|---|---|---|---|
| 7,202,608 B2 * | 4/2007 | Robinson et al. | ............. | 315/224 |
| 7,560,677 B2 * | 7/2009 | Lyons et al. | .................. | 250/205 |
| RE42,161 E * | 2/2011 | Hochstein | ........................ | 363/89 |
| 7,999,484 B2 * | 8/2011 | Jurngwirth et al. | ........... | 315/247 |
| 2009/0184662 A1 * | 7/2009 | Given et al. | .................... | 315/294 |
| 2009/0322235 A1 * | 12/2009 | Shiu et al. | ................. | 315/185 R |
| 2010/0148679 A1 * | 6/2010 | Chen et al. | ................ | 315/185 R |
| 2011/0001434 A1 * | 1/2011 | Hsu et al. | ...................... | 315/186 |
| 2011/0037410 A1 * | 2/2011 | Hsu et al. | ...................... | 315/294 |
| 2011/0062887 A1 * | 3/2011 | Hsu et al. | ...................... | 315/294 |

* cited by examiner

*Primary Examiner* — Haiss Philogene
(74) *Attorney, Agent, or Firm* — Winston Hsu; Scott Margo

(57) ABSTRACT

A light source driving device for driving a light emitting component is disclosed. The light source driving device includes a voltage converter coupled to the light emitting component for converting an input voltage into an output driving voltage according to a voltage control signal, a dimming unit coupled to the light emitting component for implementing a dimming process according to a dimming signal, a current source coupled to the dimming unit for providing a driving current to drive the light emitting component, and a control unit coupled to the dimming unit and the voltage converter for detecting a dimming state to generate a dimming detection signal and generating a reference voltage according to the dimming detection signal, wherein the control unit controls the voltage converter to generate the output driving voltage so as to driving the light emitting component.

19 Claims, 4 Drawing Sheets

LIGHT SOURCE DRIVING DEVICE CAPABLE OF DYNAMICALLY KEEPING CONSTANT CURRENT SINK AND RELATED METHOD

BACKGROUND OF THE INVENTION

1. Field of the Invention

The present invention relates to a light source driving device and a related method, and more particularly, to a light source driving device capable of keeping constant current sink through dynamically detecting a dimming process and related method.

2. Description of the Prior Art

Light emitting diodes (LEDs) offer advantages of energy savings, long device lifetime, no mercury used, high achievable color gamut, without idle time, and fast response speed, so that LED technology is widely applied in fields of display and illumination. In addition, compared with a conventional light source device, light emitting diodes are suitable for fabrication as a tiny device or an array device, such as in traffic lights, outdoor displays, backlight modules of liquid crystal displays, PDAs, notebooks, or mobile phones with features of small size, shock resistance, ease of mass production, and high applicability.

Regarding physical properties of LEDs, current passing through an LED increases exponentially with increasing forward bias of the LED, and the brightness of the LED is directly proportional to the current through the LED. As more current passes through the LED, more brightness is available. Thus, in the prior art, an LED driving device usually uses a pulse width modulation (PWM) dimming mechanism to adjust the brightness of the LED. The PWM dimming mechanism takes advantage of a PWM signal to control an average current provided by a current source to the LED. When the PWM signal is at high logical level, the current source is conducted to provide a current for the LED. When the PWM signal is at low logic level, the current source stops providing the current for the LED. Therefore, if the PWM signal stays at the high logic level longer, the LED shines brighter. In other words, the brightness of the LED can be controlled by changing duty cycle of the PWM signal.

However, while performing the abovementioned PWM dimming process, since the current source and the LED are alternately connected to and disconnected from each other, the output driving voltage for driving the LED may exhibit a high ripple effect. As a result, a headroom voltage of the current source, i.e. available voltage value for the current source on each LED path, will change with the variation of the output driving voltage. In such a condition, the headroom voltage may be too high or too low, and will result in some unwanted effects. For example, if the headroom voltage is too high, the power consumption of the current source will increase, and the power conversion efficiency will be reduced. If the headroom voltage is not high enough, the current source will operate in an improper state, and cannot keep constant current sink, even to the point of not being able to provide the required driving current to the LED, and the LED will not conduct.

SUMMARY OF THE INVENTION

It is therefore an objective of the present invention to provide a light source driving device and a related method.

The present invention discloses a light source driving device capable of dynamically keeping constant current sink for driving a light emitting component. The light source driving device, the light source driving device includes a voltage converter, a dimming unit, a current source, a control unit. The voltage converter is coupled to the light emitting component for converting an input voltage into an output driving voltage according to a voltage control signal. The dimming unit is coupled to the light emitting component for performing a dimming process according to a dimming signal. The current source is coupled to the dimming unit for providing a driving current to drive the light emitting component. The control unit is coupled to the dimming unit and the voltage converter for detecting a dimming state to generate a dimming detection signal and generating a reference voltage according to the dimming detection signal. The control unit controls the voltage converter to convert the output driving voltage so as to drive the light emitting component.

The present invention further discloses a method capable of dynamically keeping constant current sink for a light emitting component. The method includes the steps of detecting a dimming state to generate a dimming detection signal, generating a reference voltage according to the dimming detection signal, and controlling a voltage converter to generate an output driving voltage to drive the light emitting component according to the reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
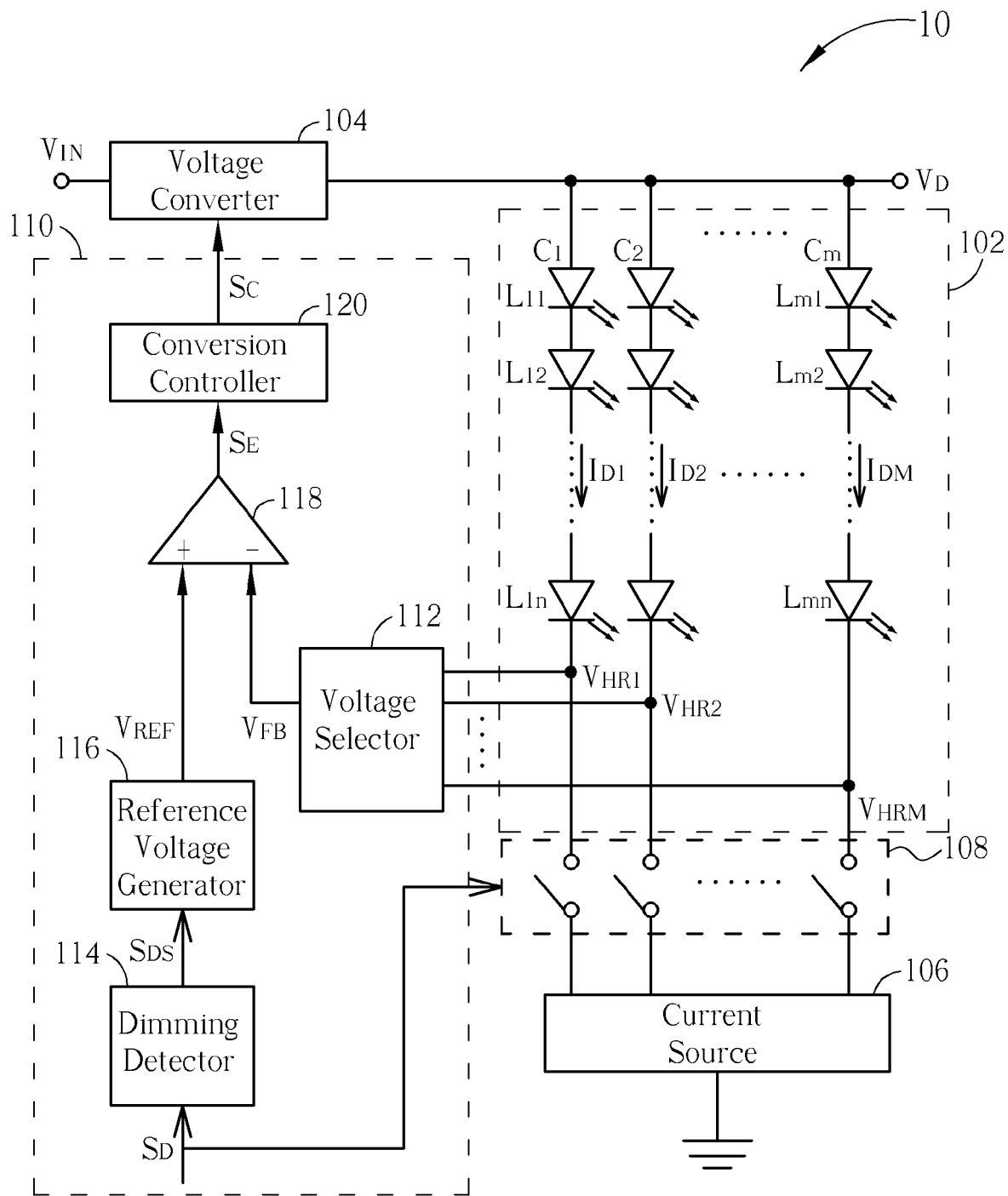
FIG. 1 is a schematic diagram of a light source driving device capable of dynamically keeping constant current sink according to an embodiment of the present invention.

Please refer to FIG. 1, which is a schematic diagram of a light source driving device 10 capable of dynamically keeping constant current sink according to an embodiment of the present invention. The light source driving device 10 is utilized for driving a light emitting component 102, which includes a voltage converter 104, a current source 106, a dimming unit 108, and a control unit 110. Note that the light source driving device 10 can be applied to any kind of light source. In the embodiment of the present invention, the light emitting component 102 includes a plurality of light-emitting diode (LED) chains C1 to Cm, and this should not be a limitation of the present invention. In other words, the light emitting component 102 can also have one LED chain only. On the other hand, since the LED is a current driven component, the brightness of the LED is proportional to the driving current. Therefore, each LED chain includes at least one LED in series, such as having n LEDs on each LED chain, and the number of the LEDs included in each LED chain must be the same in order to allow the current through each LED to be identical and result in the same brightness. As shown in FIG. 1, the voltage converter 104 is coupled to the light emitting component 102 for converting an input voltage $V_{IN}$ into an output driving voltage $V_D$ according to a voltage control signal $S_C$ so as to provide the output driving voltage $V_D$ to the light emitting component 102. The dimming unit 108 is coupled to the light emitting component 102 and the current source 106 for performing a dimming process according to a dimming signal $S_D$. The current source 106 is coupled to the dimming unit 108 for providing driving currents $I_{D1}$ to $I_{Dm}$ for LED chains C1 to Cm to drive the light emitting component 102. The control unit 110 is coupled to the dimming unit 108 and the voltage converter 104 for detecting a dimming state D to generate a dimming detection signal $S_{DS}$, and for generating a reference voltage $V_{REF}$ according to the dimming detection signal $S_{DS}$. Moreover, the control unit 102 controls the voltage converter 104 to generate the output driving voltage $V_D$ to drive the light emitting component according to reference voltage $V_{REF}$. Furthermore, as the dimming detection signal $S_{DS}$ indicates the dimming process is begun, i.e. the light emitting component 102 has a dimming requirement, the control unit 110 generates the reference voltage $V_{REF}$ at a level higher than a predetermined reference voltage $V_{REF\_P}$. The predetermined reference voltage $V_{REF\_P}$ is a predetermined ideal headroom voltage which is set for normal operation. Also, as the dimming detection signal $S_{DS}$ indicates the dimming process is begun, i.e. the light emitting component 102 does not have a dimming requirement, the control unit 110 generates the reference voltage $V_{REF}$ which is equal to predetermined reference voltage $V_{REF\_P}$.

Preferably, the dimming unit 108 may be a pulse width modulation dimming unit, and the dimming signal $S_D$ is a pulse width modulation signal. Therefore, according to the logic level of the dimming signal $S_D$, the dimming unit 108 can control connection between the light emitting component 102 and the current source 106 to conduct so as to provide the driving currents $I_{D1}$ to $I_{Dm}$ for the light emitting component 102 when the dimming signal $S_D$ is at a high logic level. In such a condition, the dimming unit 108 can vary the average current of the driving current $I_{D1}$ to $I_{Dm}$ through adjusting duty cycle of the dimming signal $S_D$. In other words, the dimming unit 108 can realize the dimming purpose by arranging duty cycle of the pulse width modulation signal. Otherwise, the dimming unit 108 can control connection between the light emitting component 102 and the current source 106 to be cut off to stop providing the driving current $I_{D1}$ to $I_{Dm}$ for the light emitting component 102 when the dimming signal $S_D$ is at a low logic level.

Please further refer to FIG. 1. The control unit 110 includes a voltage selector 112, a dimming detector 114, a reference voltage generator 116, an error amplifier 118, and a conversion controller 120. The voltage selector 112 is coupled to the light emitting component 102 for selecting a feedback voltage $V_{FB}$ from headroom voltages $V_{HR1}$ to $V_{HRm}$ corresponding to the plurality of LED chains C1 to Cm. The dimming detector 114 is coupled to the dimming unit 108 for detecting the dimming state D to generate a dimming detection signal $S_{DS}$, and the dimming state D indicates whether to perform the dimming process or indication of the dimming signal $S_D$. In other words, the dimming detector 114 can generate the dimming detection signal $S_{DS}$ by directly detecting operation state of the dimming unit 108 or indication of the dimming signal $S_D$. The reference voltage generator 116 is coupled to the dimming detector 114 for generating a reference voltage $V_{REF}$ according to the dimming detection signal $S_{DS}$. Moreover, a positive input terminal and a negative input terminal of the error amplifier 118 are coupled to the voltage selector and the reference voltage generator respectively for generating an error voltage signal $S_E$ according to the feedback voltage $V_{FB}$ and the reference voltage $V_{REF}$. The conversion controller 120 is coupled to an output terminal of the error amplifier 118 and the voltage converter 104 for generating the voltage control signal $S_C$ for the voltage converter 104 according to the error voltage signal $S_E$. Therefore, when the feedback voltage $V_{FB}$ is greater than or less than the reference voltage $V_{REF}$, the error amplifier 118 can generate the error voltage signal $S_E$ according to the difference of the feedback voltage $V_{FB}$ and the reference voltage $V_{REF}$ to inform the conversion controller 120. After that, the conversion controller 120 can generate the voltage control signal $S_C$ to control increasing or decreasing of the output driving voltage $V_D$. In short, the control unit 110 is able to detect whether the dimming process is being performed immediately, and is further able to adjust the reference voltage $V_{REF}$ for the error amplifier 118 dynamically, so that a proper output driving voltage $V_D$ is immediately available through feedback tracking. As a result, the present invention can prevent too much or not enough headroom voltage of the current source during the dimming process, so that the present invention can keep constant current sink for driving the light emitting component, enhance power conversion efficiency, and extend use time of the light emitting component.

Figure 2:
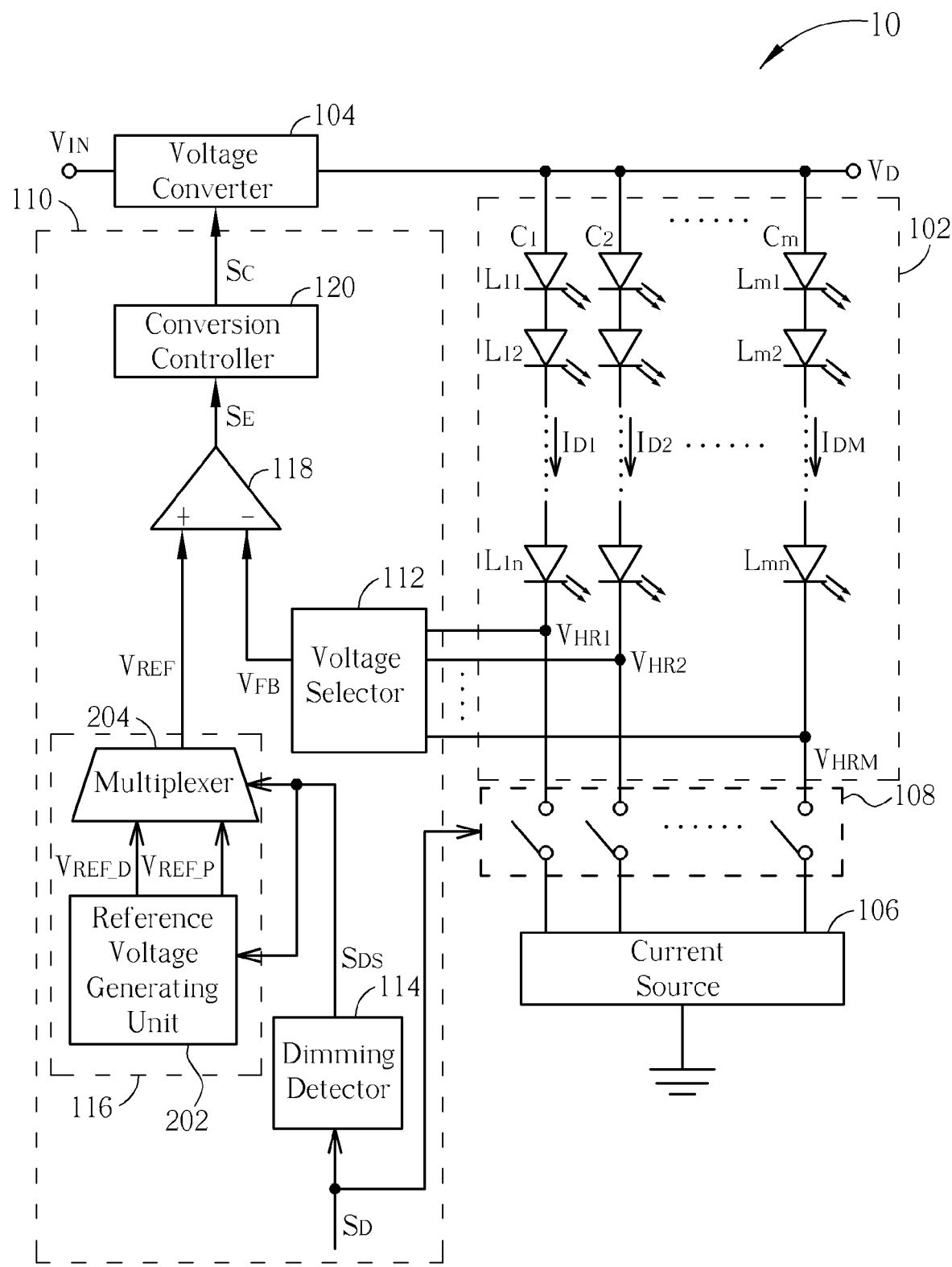
FIG. 2 is a schematic diagram of a reference voltage generator according to a first embodiment of the present invention.
Figure 3:
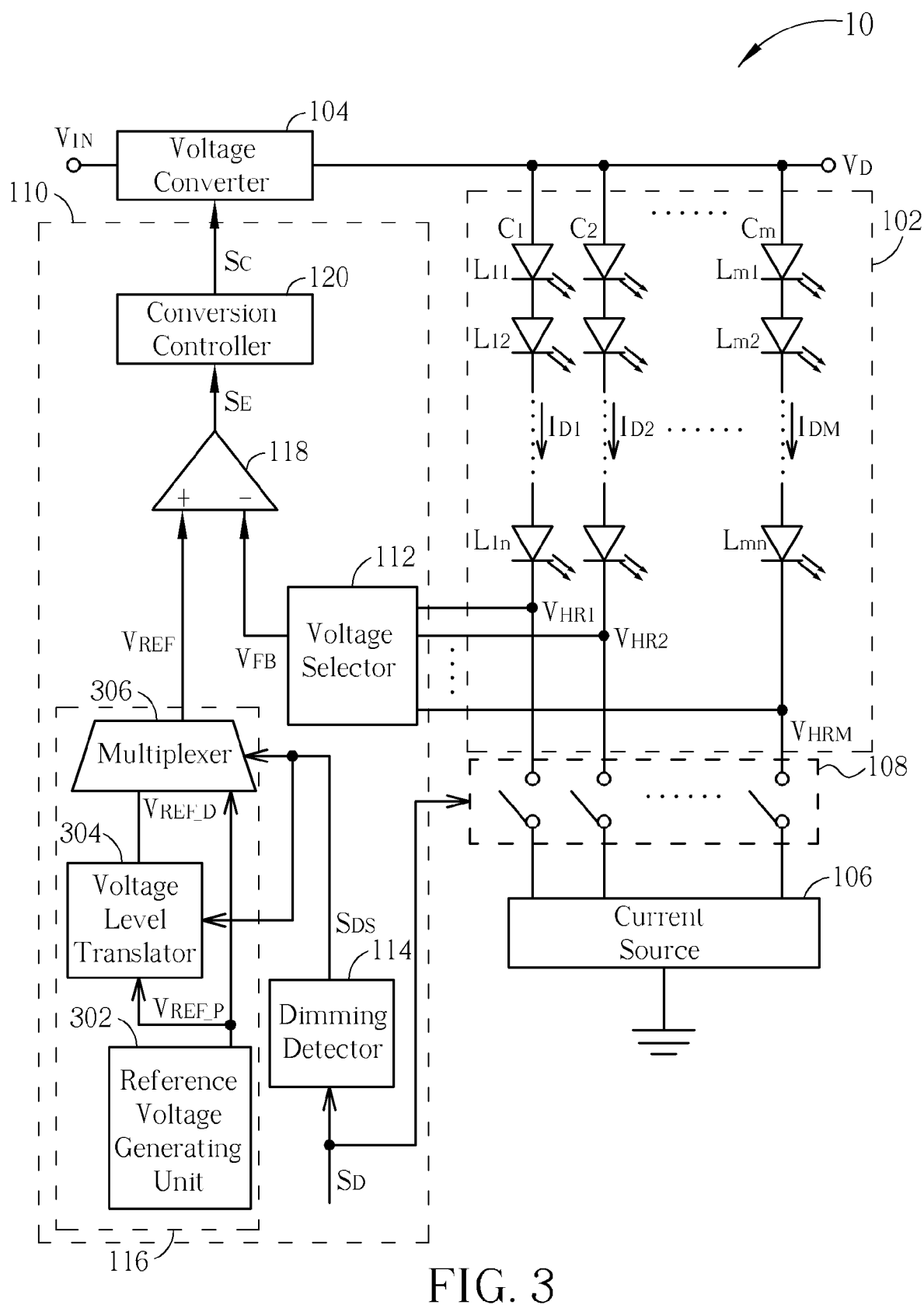
FIG. 3 is a schematic diagram of a reference voltage generator according to a second embodiment of the present invention.

On other hand, in the light source driving device 10, the reference voltage generator 116 is utilized for providing various voltages in accordance with requirements, so the reference voltage generator 116 may generate the required reference voltage $V_{REF}$ by any available method. For example, as shown in FIG. 2, the reference voltage generator 116 includes a reference voltage generating unit 202 and a multiplexer 204. The reference voltage generating unit 202 is coupled to the dimming detector 114 for generating a predetermined reference voltage $V_{REF\_P}$ and a dimming reference voltage $V_{REF\_D}$ according to the dimming detection signal $S_{DS}$. The multiplexer 204 is coupled to the reference voltage generating unit 202, the dimming detector 114, and the error amplifier 118 for selecting the reference voltage $V_{REF}$ from the predetermined reference voltage $V_{REF\_P}$ and the dimming reference voltage $V_{REF\_D}$ according to the dimming detection signal $S_{DS}$, and providing the selected reference voltage $V_{REF}$ to the error amplifier 118. In addition, as shown in FIG. 3, the reference voltage generator 116 can also include a reference voltage generating unit 302, a voltage level translator 304, and a multiplexer 306. The reference voltage generating unit 302 is utilized for generating a predetermined reference voltage $V_{REF\_P}$. The voltage level translator 304 is coupled to the dimming detector 114 and the reference voltage generating unit 302 for translating the predetermined reference voltage $V_{REF\_P}$ to the dimming reference voltage $V_{REF\_D}$ according to the dimming detection signal $S_{DS}$. The multiplexer 306 is coupled to the reference voltage generating unit 302, the voltage level translator 304, the dimming detector 114, and the error amplifier 118 for selecting the reference voltage $V_{REF}$ from the predetermined reference voltage $V_{REF\_P}$ and the dimming reference voltage $V_{REF\_D}$ according to the dimming detection signal $S_{DS}$, and further providing the selected reference voltage $V_{REF}$ to the error amplifier 118. Note that, the reference voltage generator 116 can produce a proper dimming reference voltage $V_{REF\_D}$ according to the dimming detection signal $S_{DS}$ to compensate for varied voltage values of the output driving voltage during the dimming process. For example, for the dimming unit 108 using pulse width modulation mechanisms, amount of the dimming reference voltage $V_{REF\_D}$ can be a sum of the amount of amplitude of the predetermined reference voltage $V_{REF\_P}$ and the pulse width modulation signal. Thus, when the dimming detection signal $S_{DS}$ indicates the dimming process is begun, the multiplexer 306 selects the dimming reference voltage $V_{REF\_D}$ as the reference voltage $V_{REF}$, and when the dimming detection signal $S_{DS}$ indicates the dimming process is not performed, the multiplexer 306 selects predetermined reference voltage $V_{REF\_P}$ as the reference voltage $V_{REF}$.

Note that above mentioned embodiments are exemplary embodiments of the present invention, and those skilled in the art can make alternations and modifications accordingly. For example, the voltage selector 112 can select the feedback voltage $V_{FB}$ among the headroom voltages $V_{HR1}$ to $V_{HRm}$ according to any rule, such as the voltage selector 112 can select the lowest headroom voltage from the headroom voltages $V_{HR1}$ to $V_{HRm}$ as the feedback voltage $V_{FB}$.

Therefore, the present invention can detect in real-time whether the dimming process is being performed, and further adjust the reference voltage $V_{REF}$ dynamically to control the voltage converter 104 to provide the proper output driving voltage $V_D$. As a result, the present invention can prevent too much or not enough of the headroom voltage of the current source during the dimming process, so that the present invention can keep constant current sink for driving the light emitting component, enhance power conversion efficiency, and extend the use time of the light emitting component.

Figure 4:
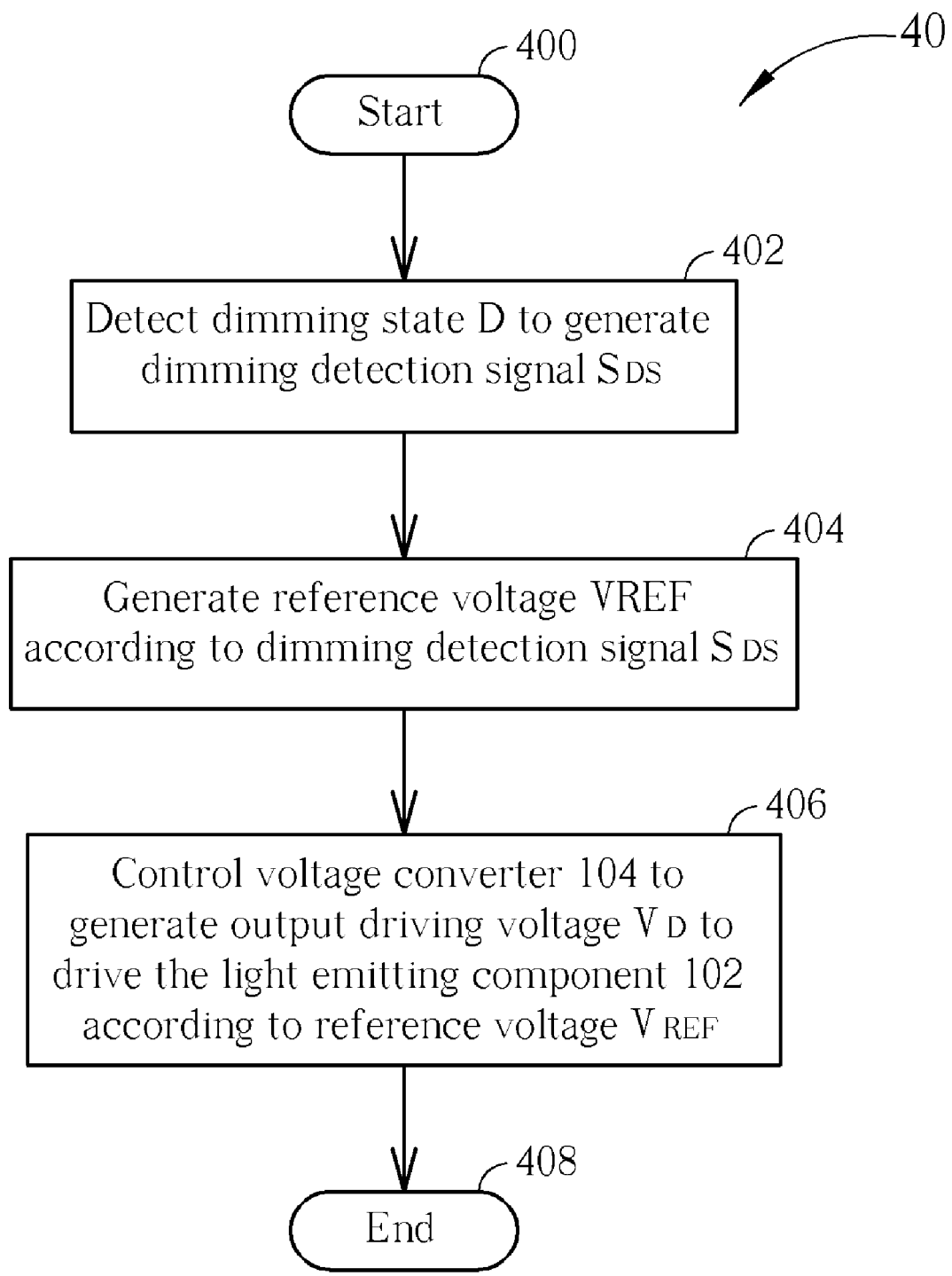
FIG. 4 is a procedure according to an embodiment of the invention.

As to the implementation of the light source driving device 10, please refer to FIG. 4. FIG. 4 is a procedure 40 according to an embodiment of the invention. The procedure comprises the following steps:

Step 400: Start.

Step 402: Detect dimming state D to generate dimming detection signal $S_{DS}$.

Step 404: Generate reference voltage $V_{REF}$ according to dimming detection signal $S_{DS}$.

Step 406: Control voltage converter 104 to generate output driving voltage $V_D$ to drive the light emitting component 102 according to reference voltage $V_{REF}$.

Step 408: End.

The procedure 40 is utilized for illustrating the implementation of the light source driving device 10. Related variations and the detailed description can be referred from the foregoing description, so as not to be narrated herein.

In summary, the present invention can detect in real-time whether the dimming process is being performed, and further dynamically adjust the reference voltage $V_{REF}$ to control the voltage converter 104 to provide the proper output driving voltage $V_D$. As a result, the present invention can prevent too much or not enough of the headroom voltage of the current source during the dimming process, so that the present invention can keep constant current sink for driving the light emitting component, enhance power conversion efficiency, and extend the use time of the light emitting component.

Those skilled in the art will readily observe that numerous modifications and alterations of the device and method may be made while retaining the teachings of the invention.

What is claimed is:

1. A light source driving device capable of dynamically keeping constant current sink for driving a light emitting component, the light source driving device comprising:
   a voltage converter, coupled to the light emitting component, for converting an input voltage into an output driving voltage according to a voltage control signal;
   a dimming unit, coupled to the light emitting component, for performing a dimming process according to a dimming signal;
   a current source, coupled to the dimming unit, for providing a driving current to drive the light emitting component; and
   a control unit, coupled to the dimming unit and the voltage converter, for detecting a dimming state to generate a dimming detection signal and generating a reference voltage according to the dimming detection signal;
   wherein the control unit controls the voltage converter to generate the output driving voltage so as to drive the light emitting component.

2. The light source driving device of claim 1, wherein the light emitting component comprises a plurality of light-emitting diode (LED) chains.

3. The light source driving device of claim 2, wherein each LED chain of the plurality of LED chains comprises a plurality of LEDs in series.

4. The light source driving device of claim 1, wherein the dimming unit controls connection between the light emitting component and the current source to conduct or be cut off according to the dimming signal.

5. The light source driving device of claim 1, wherein the control unit comprises:
   a voltage selector, coupled to the light emitting component, for selecting a feedback voltage from at least one headroom voltage corresponding to the light emitting component;
   a dimming detector, coupled to the dimming unit for detecting the dimming state to generate a dimming detection signal;
   a reference voltage generator, coupled to the dimming detector, for generating a reference voltage according to the dimming detection signal;
   an error amplifier, coupled to the voltage selector and the reference voltage generator, for generating an error voltage signal according to the feedback voltage and the reference voltage; and
   a conversion controller, coupled to the error amplifier and the voltage converter, for generating the voltage control signal according to the error voltage signal for the voltage converter.

6. The light source driving device of claim 5, wherein the voltage selector selects the lowest headroom voltage from the at least one headroom voltage as the feedback voltage.

7. The light source driving device of claim 5, wherein the reference voltage generator comprises:
   a reference voltage generating unit, coupled to the dimming detector, for generating a predetermined reference voltage and a dimming reference voltage according to the dimming detection signal; and
   a multiplexer, coupled to the reference voltage generating unit, the dimming detector, and the error amplifier, for selecting the reference voltage from the predetermined reference voltage and the dimming reference voltage according to the dimming detection signal, and providing the selected reference voltage to the error amplifier.

8. The light source driving device of claim 5, wherein the reference voltage generator comprises:
   a reference voltage generating unit, for generating a predetermined reference voltage;
   a voltage level translator, coupled to the dimming detector and the reference voltage generating unit, for translating the predetermined reference voltage to a dimming reference voltage according to the dimming detection signal; and
   a multiplexer, coupled to the reference voltage generating unit, the voltage level translator, the dimming detector, and the error amplifier, for selecting the reference voltage from the predetermined reference voltage and the dimming reference voltage according to the dimming detection signal, and for providing the selected reference voltage to the error amplifier.

9. The light source driving device of claim 1, wherein the control unit generates the reference voltage at a level higher than a predetermined reference voltage when the dimming detection signal indicates the dimming process is begun.

10. The light source driving device of claim 1, wherein the control unit generates the reference voltage at a level equal to a predetermined reference voltage when the dimming detection signal indicates the dimming process is not performed.

11. The light source driving device of claim 1, wherein the control unit detects the dimming signal to generate the dimming detection signal.

12. A method of dynamically keeping constant current sink for a light emitting component, the method comprising the steps of:
    detecting a dimming state to generate a dimming detection signal;
    generating a reference voltage according to the dimming detection signal; and
    controlling a voltage converter to generate an output driving voltage to drive the light emitting component according to the reference voltage.

13. The method of claim 12, wherein the light emitting component comprises a plurality of LED chains.

14. The method of claim 13, wherein each LED chain of the plurality of LED chains comprises a plurality of LEDs in series.

15. The method of claim 12, wherein the step of detecting the dimming state to generate the dimming detection signal comprises:
    detecting a dimming signal to generate the dimming detection signal.

16. The method of claim 12, wherein the step of generating the reference voltage according to the dimming detection signal comprises:
    generating the reference voltage at a level higher than a predetermined reference voltage when the dimming detection signal indicates a dimming process is begun.

17. The method of claim 12, wherein the step of generating the reference voltage according to the dimming detection signal comprises:
    generating the reference voltage at a level equal to a predetermined reference voltage when the dimming detection signal indicates the dimming process is not performed.

18. The method of claim 12, wherein the step of controlling a voltage converter to generate the output driving voltage to drive the light emitting component comprises:
    selecting a feedback voltage from the light emitting component;
    generating a voltage control signal according to a feedback voltage signal and the reference voltage; and
    generating the output driving voltage to drive the light emitting component according to the voltage control signal.

19. The method of claim 18, wherein the step of selecting the feedback voltage from the light emitting component comprises:
    selecting the lowest headroom voltage from at least one headroom voltage corresponding to the light emitting component as the feedback voltage.

* * * * *